(12) United States Patent
Dykstra et al.

(10) Patent No.: US 11,630,234 B2
(45) Date of Patent: Apr. 18, 2023

(54) METHODS AND SYSTEMS TO OPTIMIZE DOWNHOLE CONDITION IDENTIFICATION AND RESPONSE USING DIFFERENT TYPES OF DOWNHOLE SENSING TOOLS

(71) Applicant: Halliburton Energy Services, Inc., Houston, TX (US)

(72) Inventors: Jason D. Dykstra, Spring, TX (US); Yiming Zhao, Houston, TX (US); Xingyong Song, Houston, TX (US); Fanping Bu, Northville, MI (US)

(73) Assignee: Halliburton Energy Services, Inc., Houston, TX (US)

( * ) Notice: Subject to any disclaimer, the term of this patent is extended or adjusted under 35 U.S.C. 154(b) by 494 days.

(21) Appl. No.: 16/338,026

(22) PCT Filed: Dec. 8, 2016

(86) PCT No.: PCT/US2016/065663
§ 371 (c)(1),
(2) Date: Mar. 29, 2019

(87) PCT Pub. No.: WO2018/106247
PCT Pub. Date: Jun. 14, 2018

(65) Prior Publication Data
US 2021/0286102 A1    Sep. 16, 2021

(51) Int. Cl.
*G01V 11/00* (2006.01)
*E21B 47/00* (2012.01)
(Continued)

(52) U.S. Cl.
CPC ............ *G01V 11/002* (2013.01); *E21B 47/00* (2013.01); *G01V 1/50* (2013.01); *G01V 3/18* (2013.01);
(Continued)

(58) Field of Classification Search
None
See application file for complete search history.

(56) References Cited

U.S. PATENT DOCUMENTS 10,323,501 B2 *   6/2019   Weston ................... E21B 47/00
2005/0197777 A1   9/2005   Rodney et al.
(Continued)

FOREIGN PATENT DOCUMENTS

KR   20140050306 A *   4/2014 ............. G06F 17/50
WO   2006041566 A1   4/2006
WO   2018106247 A1   6/2018

*Primary Examiner* — Lina M Cordero
(74) *Attorney, Agent, or Firm* — Benjamin Ford; Parker Justiss, P.C.

(57) ABSTRACT

A system includes different types of downhole sensing tools deployed in a borehole, wherein the different types of downhole sensing tools are optimized to identify a downhole condition based on a predetermined downhole evaluation plan that accounts for sensing tool availability and performance constraints. The system also includes at least one processing unit configured to analyze measurements collected by the different types of downhole sensing tools, wherein the collected measurements are analyzed together to identify the downhole condition. The system also includes at least one device that performs an operation in response to the identified downhole condition.

18 Claims, 5 Drawing Sheets

(51) Int. Cl.
*G01V 1/50* (2006.01)
*G01V 3/18* (2006.01)
*G01V 3/38* (2006.01)
*G01V 5/04* (2006.01)

(52) U.S. Cl.
CPC ............... *G01V 3/38* (2013.01); *G01V 5/04* (2013.01); *G01V 2210/663* (2013.01)

(56) References Cited

U.S. PATENT DOCUMENTS

| | | | |
|---|---|---|---|
| 2006/0220649 A1 | 10/2006 | Martinez et al. | |
| 2009/0037111 A1 | 2/2009 | Radtke et al. | |
| 2010/0257926 A1* | 10/2010 | Yamate | E21B 49/08 73/152.23 |
| 2013/0145837 A1* | 6/2013 | Yamate | E21B 49/00 73/152.28 |
| 2015/0267524 A1* | 9/2015 | Embid Droz | G01V 99/005 700/275 |

\* cited by examiner

METHODS AND SYSTEMS TO OPTIMIZE DOWNHOLE CONDITION IDENTIFICATION AND RESPONSE USING DIFFERENT TYPES OF DOWNHOLE SENSING TOOLS

CROSS-REFERENCE TO RELATED APPLICATION

This application is the National Stage of, and therefore claims the benefit of, International Application No. PCT/US2016/065663 filed on Dec. 8, 2016, entitled "METHODS AND SYSTEMS TO OPTIMIZE DOWNHOLE CONDITION IDENTIFICATION AND RESPONSE USING DIFFERENT TYPES OF DOWNHOLE SENSING TOOLS," which was published in English under International Publication Number WO 2018/106247 on Jun. 14, 2018. The above application is commonly assigned with this National Stage application and is incorporated herein by reference in its entirety.

BACKGROUND

Hydrocarbon exploration and production involves drilling boreholes, completing wells, and ongoing maintenance (hereafter these operations are referred to as well operations), where different wells can be used for exploration operations, monitoring operations, injection operations, and production operations. Well operations are expensive and mistakes results in increased costs and lost time. In some cases, poorly executed well operations can result in wells being unsuitable for their intended use. In such case, wells may need to be plugged or replaced.

Efforts to improve the efficiency of and/or to reduce mistakes during well operations are ongoing. Some of these efforts involve collecting downhole measurements before or during well operations to be performed. Collecting downhole measurements can be helpful, but issues such as sub-optimal tool or sensor configurations, inaccurate sensors, inaccurate inversion models, and lost time remain.

BRIEF DESCRIPTION OF THE DRAWINGS

Accordingly, there are disclosed herein methods and systems to optimize downhole condition identification and response using different types of downhole sensing tools. In the drawings.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are methods and systems for optimized downhole condition identification and response involving different types of downhole sensing tools. As used herein, "downhole sensing tools" refer to individual sensors, distributed sensing systems, dedicated logging tools (e.g., a resistivity logging tool, an acoustic logging, a nuclear magnetic resonance logging tool, a gamma ray logging tool, a porosity logging tool, a litho-density logging tool, etc.), or a combination thereof. In at least some embodiments, some of the different types of downhole sensing tools in a borehole are permanently installed. Additionally or alternatively, some of the different types of downhole sensing tools in a borehole are temporarily deployed. Example deployment options include wireline, slick line, coiled tubing, a casing string, wired pipe, or other deployment options. Without limitation, the downhole sensing tools may measure pressure, temperature, strain, electromagnetic phenomena (resistivity or conductivity), nuclear magnetic resonance, gamma rays, acoustic signals, porosity, density, and/or other parameters. Some downhole sensing tools may measure the same parameter, while other downhole sensing tools measure different parameters. The measurements collected by the different types of downhole sensing tools are analyzed together to identify a downhole condition. The different downhole sensing tools deployed in a borehole, their arrangement, and the analysis applied to measurements collected by the different downhole sensing tools results in accurate identification of the downhole condition subject to sensor tool availability and performance constraints. Also, operations that rely on accurate downhole condition identification are improved. Example operations performed in response to identifying the downhole condition include perforation operations (e.g., performed by a perforator) or other well completion operations, downhole condition display operations (e.g., performed by an output device such as a computer monitor or printer), and well intervention or well repair operations.

In at least some embodiments, the selection of which downhole sensing options to deploy in a borehole and/or the selection of how the downhole sensing tools to be deployed are arranged is based on a predetermined downhole evaluation plan that accounts for sensing option availability and performance constraints. As an example, the predetermined downhole evaluation plan may be based on selection of one of a plurality of different downhole evaluation plans. In some embodiments, the selection process involves a user (e.g., a user selects one of a plurality of downhole evaluation plans as the predetermined downhole evaluation plan). Additionally or alternatively, the selection process involves minimizing an objective function. Additionally or alternatively, the predetermined downhole evaluation plan may be based on a model that correlates different combinations of downhole sensing tools with intermediate decision variables. The intermediate decision variables may vary for different well operations. As an example, for well operations that involve perforating a well, an intermediate decision variable can be the predetermined location of hydrocarbons.

In at least some embodiments, an example system includes different types of downhole sensing tools deployed in a borehole, wherein the different types of downhole sensing tools are optimized to identify a downhole condition based on a predetermined downhole evaluation plan that accounts for sensing tool availability and performance constraints. The system also includes at least one processing unit configured to analyze measurements collected by the different types of downhole sensing tools, wherein the collected measurements are analyzed together to identify the downhole condition. The system also includes at least one device that performs an operation in response to the identified downhole condition.

Meanwhile, an example method includes deploying different types of downhole sensing tools in a borehole, wherein the different types of downhole sensing tools are optimized to identify a downhole condition based on a predetermined downhole evaluation plan that accounts for sensing tool availability and performance constraints. The method also includes analyzing, by at least one processing unit, measurements collected by the different types of downhole sensing tools, wherein the measurements are analyzed together to identify the downhole condition. The method also includes performing, by at one least device, an operation in response to the identified downhole condition. Various downhole sensing tool options, downhole sensing tool planning options, downhole sensing tool control options, downhole sensing tool measurement analysis options, and analysis response options are described herein.

Figure 1:
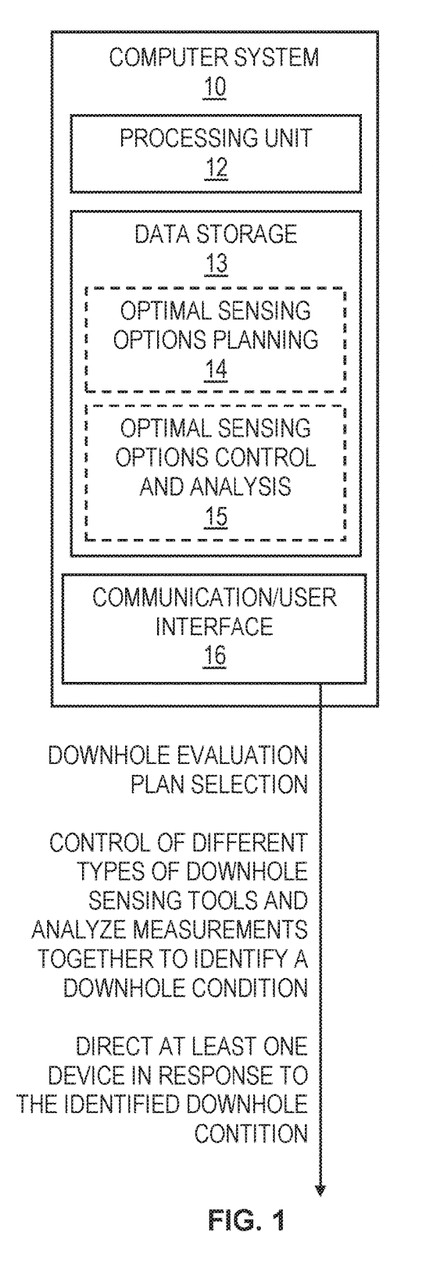
FIG. 1 is a block diagram showing an illustrative computer system.

FIG. 1 is a block diagram showing an illustrative computer system 10 that may be used to plan, control, and/or analyze sensing options as described herein. In the embodiment of FIG. 1, the computer system 10 includes a processing unit 12, a data storage 13, and a communication/user interface 16. The processing unit 12 may correspond to one or more central processing units (CPUs), programmable components, and/or application-specific integrated circuits (ASICs). Meanwhile, the data storage 13 may correspond to read-only memory (ROM), random access memory (RAM), Flash drives, hard drives, optical storage disks, and/or other non-transitory computer-readable mediums. The communication/user interface 16 may correspond to a network interface for communicating with local and/or remote devices. Additionally or alternatively, communication/user interface 16 may correspond to input devices (e.g., a keyboard, mouse, touchpad, etc.). Additionally or alternatively, communication/user interface 16 may correspond to output device(s) 58 (e.g., a monitor, printer, etc.). The communication/user interface 16 enables sensing options planning, sensing options control, or sensing options analysis involving user inputs and/or user review.

In at least some embodiments, sensing options planning involves the processing unit 12 executing an optimal sensing options planning module 14 stored by the data storage 13. As an example, when executed, instructions or rules of the optimal sensing options planning module 14 enable the processing unit 12 to select different types of downhole sensing tools to identify a downhole condition in accordance with a downhole evaluation plan. The downhole evaluation plan may account for factors such as sensing tool availability and performance constraints. Example performance constraints include, but are not limited to, a cost constraint, an accuracy constraint, a reliability constraint, and a time constraint. In at least some embodiments, the downhole evaluation plan is selected from a plurality of different downhole evaluation plans. The selection of a downhole evaluation plan from a plurality of different downhole evaluation plans may involve user input and/or minimizing an objective function. In at least some embodiments, the downhole evaluation plan is based on a model that correlates different combinations of downhole sensing tools with intermediate decision variables. The intermediate decision variables may vary for different well operations. As an example, for well operations that involve perforating a well, an intermediate decision variable can be the predetermined location of hydrocarbons.

In at least some embodiments, sensing options control and analysis involves the processing unit 12 executing an optimal sensing options control and analysis module 15 stored by the data storage. As an example, when executed, instructions or rules of the optimal sensing options control and analysis module 15 enable the processing unit 12 to provide control instructions or control signals to different types of downhole sensing tools deployed in a borehole to collect measurements that can be used to identify a downhole condition. Additionally or alternatively, when executed, instructions or rules of the optimal sensing options control and analysis module 15 enable the processing unit 12 to analyze measurements collected by different types of downhole sensing tools together to identify the downhole condition. In at least some embodiments, a predetermined correlation matrix and/or a predetermined weighting matrix is used to analyze the measurements collected by different types of downhole sensing tools.

In response to the computer system 10 identifying the downhole condition, at least one device may be directed to perform an operation. For example, the processing unit 12 may transmit information or a command to the at least one device via the communication/user interface 16. Additionally or alternatively, the communication/user interface 16 may present information or prompts to a user, whereby the user directs the device based on the information or prompts. As an example, the at least one device may comprise an output device local to or remote from the computer system 10 that displays a representation of the downhole condition. As another example, the at least one device comprises a perforator deployed in a borehole that is responsive to predetermined or real-time instructions.

While a single computer system 10 is represented in FIG. 1, it should be appreciated that multiple computer systems could be used to perform sensing options planning, sensing options control, and sensing options analysis as described herein. As an example, a first computer system may store and execute instructions of the optimal sensing options planning module 14 as described herein, while one or more other computer systems store and execute instructions of the optimal sensing options control and analysis module 15. Further, the operations related to the optimal sensing options control and analysis module 15 could be further divided into parts that are executed by one or more computer systems.

Regardless of the number of computer systems involved, the result of optimal sensing options planning operations (e.g., by executing the optimal sensing options planning module 14) includes downhole evaluation plan selection, where the selection is based on user input and/or predetermined rules (e.g., minimizing an objective function). Meanwhile, the result of optimal sensing options control and analysis operations (e.g., by executing the optimal sensing options control and analysis module 14) include control of different types of downhole sensing tools and analysis of corresponding measurements together to identify a downhole condition. In addition, one or more computers systems may direct at least one device in response to the identified downhole condition.

Figure 2A:
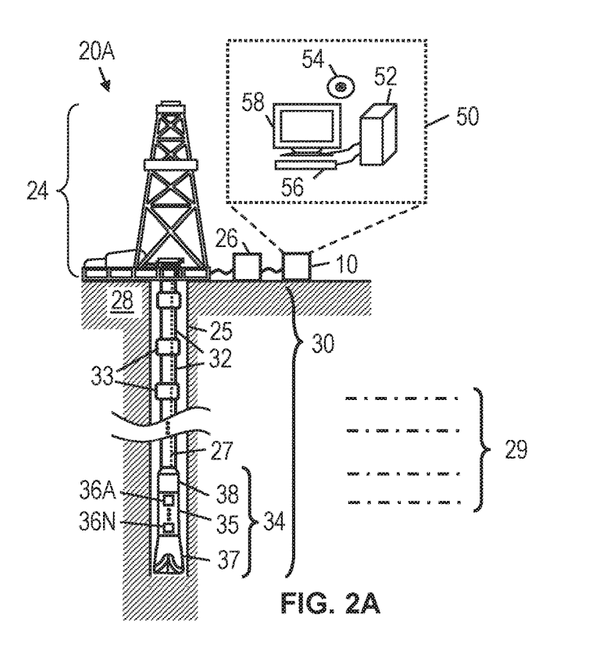
FIG. 2A is a schematic diagram showing an illustrative drilling environment.

FIG. 2A is a schematic diagram showing an illustrative drilling environment 20A. In FIG. 2A, a drilling assembly 24 enables a drill string 30 to be lowered and raised in a borehole 25 that penetrates formations 29 of the earth 28. The drill string 30 is formed, for example, from a modular set of drill string segments 32 and adaptors 33. At the lower end of the drill string 30, a bottomhole assembly (BHA) 34 with a drill bit 37 removes material from the formations 29 using known drilling techniques. The bottomhole assembly 34 also includes one or more drill collars 38 and downhole sensing tools 36A-36N. As described herein, the downhole sensing tools 36A-36N may be selected, arranged, and controlled based on a downhole evaluation plan.

In addition to the downhole sensing tools 36A-36N, the BHA 34 may also include electronics for data storage, data processing, communication, and/or other operations (e.g., at least some of the operations described for the computer system 10 of FIG. 1 can be performed by the BHA 34). Accordingly, in at least some embodiments, measurements collected by different types of sensing tools corresponding to at least some of the downhole sensing tools 36A-36N are analyzed together by electronics of the BHA 34 to identify a downhole condition as described herein. Thereafter, at least one device of the BHA 34 can be directed based on the identified downhole condition.

Additionally or alternatively, measurements collected by the downhole sensing tools 36A-36N and/or analysis results are conveyed to earth's surface using known telemetry techniques (e.g., wired pipe telemetry, mud pulse telemetry, acoustic telemetry, electromagnetic telemetry, etc.). In at least some embodiments, a cable 27 may extend from the BHA 34 to earth's surface. For example, the cable 27 may take different forms such as embedded electrical conductors and/or optical waveguides (e.g., fibers) to enable transfer of power and/or communications between the bottomhole assembly 34 and earth's surface. In other words, the cable 27 may be integrated with, attached to, or inside the modular components of the drill string 30.

In FIG. 2A, an interface 26 at earth's surface may receive measurements collected by the downhole sensing tools 36A-36N and/or analysis results via cable 27 or another telemetry channel and conveys the measurements and/or analysis results to a computer system 50, which may include the same or similar components as described for the computer system 10 described for FIG. 1. In some embodiments, the surface interface 26 and/or the computer system 50 may perform various operations such as converting signals from one format to another, storing collected measurements, analyzing the collected measurements to identify a downhole condition, responding to an identified downhole condition, and/or directing another component in response to a detected anomaly as described herein. To perform these operations and/or other operations, the computer system 50 includes a processing unit 52 that executes software or instructions related to optimal sensing options planning, optimal sensing options control, optimal sensing options analysis to identify a downhole condition, and/or response options. In at least some embodiments, the related software or instructions is obtained from a local or remote non-transitory computer-readable medium 54. The computer system 50 also may include input device(s) 56 (e.g., a keyboard, mouse, touchpad, etc.) and output device(s) 58 (e.g., a monitor, printer, etc.). Such input device(s) 56 and/or output device(s) 58 provide a user interface that enables an operator to interact with components of the BHA 34 and/or software executed by the processing unit 52. For example, the computer system 50 may enable an operator to participate in optimal sensing options planning, optimal sensing options control, optimal sensing options analysis, and/or response options.

Figure 2B:
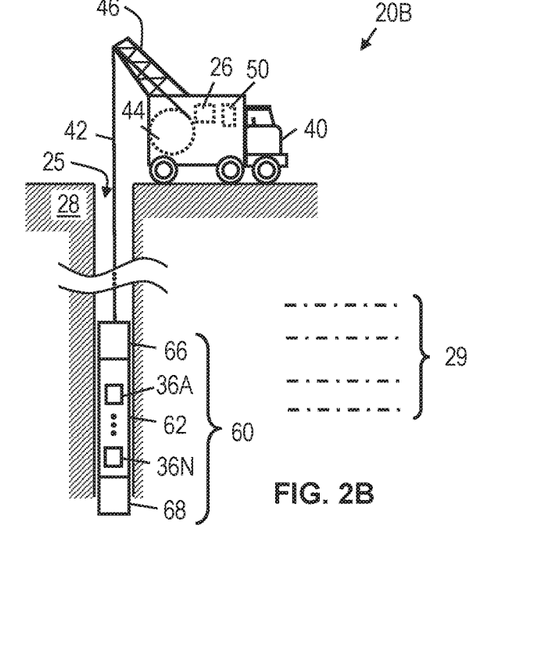
FIG. 2B is a schematic diagram showing an illustrative wireline logging environment.

At various times during the drilling process, the drill string 30 shown in FIG. 2A may be removed from the borehole 25. With the drill string 30 removed, another option for deploying different types of downhole sensing tools in a borehole to identify a downhole condition as described herein involves the wireline environment 20B of FIG. 2B. In FIG. 2B, a wireline tool string 60 is suspended in a borehole 25 that penetrates formations 29 of the earth 28. For example, the wireline tool string 60 may be suspended by a cable 42 having conductors and/or optical fibers for conveying power to the wireline tool string 60. The cable 42 may also be used as a communication interface for uplink and/or downlink communications. In at least some embodiments, the cable 42 wraps and unwraps as needed around cable reel 44 when lowering or raising the wireline tool string 60. As shown, the cable reel 44 may be part of a movable logging facility or vehicle 40 having a cable guide 46. Other options for deploying the wireline tool string 60 in a borehole 25 include, but are not limited to, slick line, coiled tubing, a casing string, or combinations. For deployment options that do not provide power to the wireline tool string 60 (e.g., a powerless slick line, coiled tubing, drillstring, or casing string), the wireline tool string 60 may include a remote power source (e.g., a battery or other remote power source) to power downhole sensing tools 36A-36N or other electronics.

In at least some embodiments, the downhole sensing tools 36A-36N are housed within a tool body 62. Without limitation, the downhole sensing tools 36A-36N may be related to resistivity logging, acoustic logging, gamma ray logging, nuclear magnetic resonance logging, etc. The wireline tool string 60 may also include electronics 66 for data storage, data processing, communication, etc. In different embodiments, measurements collected by downhole sensing tools 36A-36N of the wireline tool string 60 and/or analysis results are used to perform surface or downhole operations (with or without instructions from earth's surface) in response to an identified downhole condition. Additionally or alternatively, measurements collected by the downhole sensing tools 36A-36N of the wireline tool string 60 and/or analysis results are conveyed to earth's surface using known telemetry techniques and/or are stored by the wireline tool string 60. In some embodiments, the wireline tool string 60 may include one or more devices 68 to perform operations in response to an identified downhole condition. For example, the device 68 may correspond to a perforator that performs perforation operations at a location associated with the identified downhole condition.

In FIG. 2B, an interface 26 at earth's surface may receive measurements collected by the wireline tool string 60 and/or analysis results via cable 42 or another telemetry channel and conveys the measurements and/or analysis results to a computer system 50 (e.g., part of the movable logging facility or vehicle 40). In some embodiments, the surface interface 26 and/or the computer system 50 may perform various operations related to optimal sensing options planning, optimal sensing options control, optimal sensing options analysis to identify a downhole condition, and/or response options.

Figure 2C:
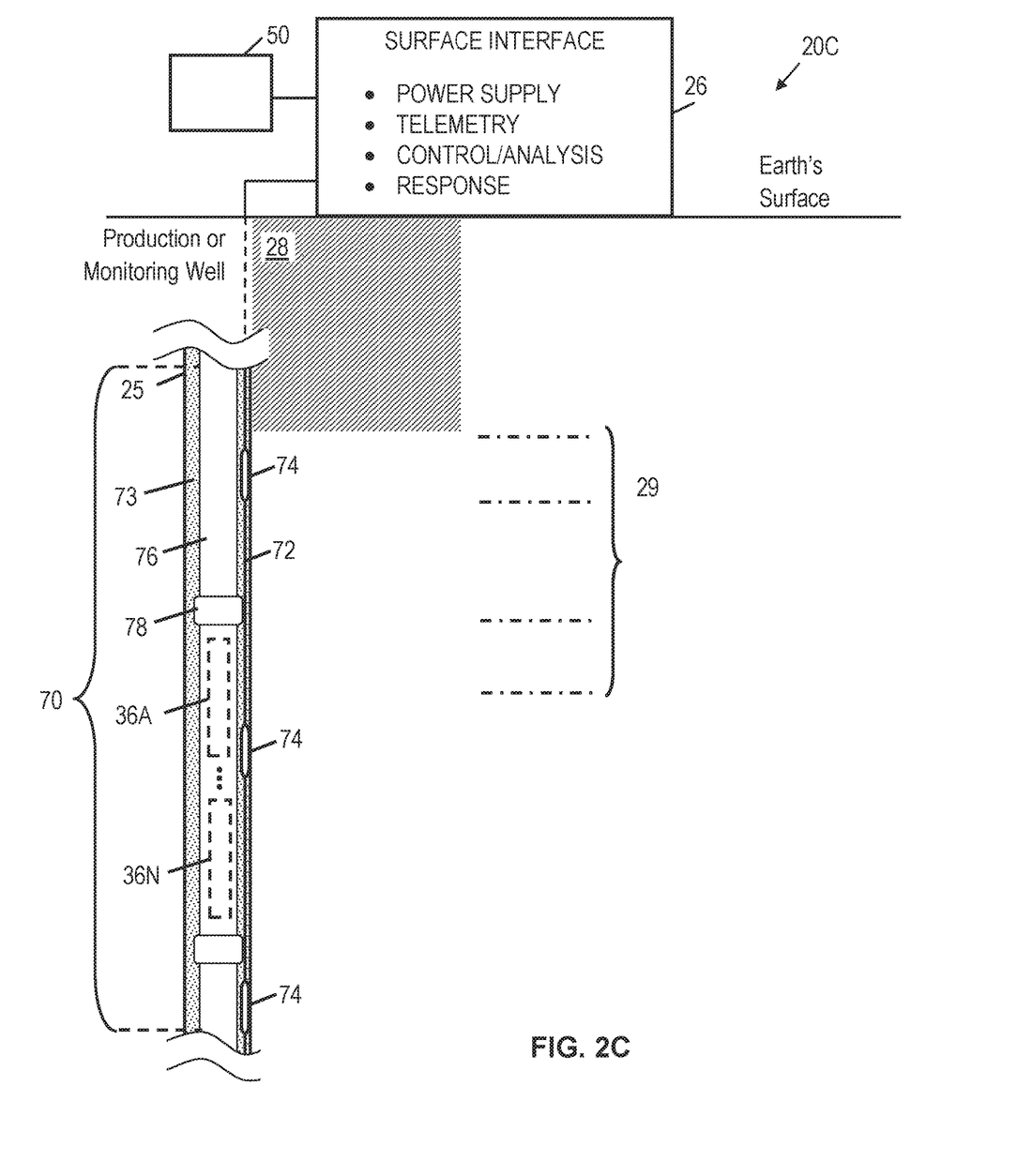
FIG. 2C is a schematic diagram showing an illustrative production or monitoring well environment.

FIG. 2C is a schematic diagram showing an illustrative production or monitoring well environment 20C. As shown, the production or monitoring well environment 20C includes a computer system 50 and a surface interface 26 to perform the same or similar operations as described previously for FIGS. 2A and 2B. For example, the surface interface 26 and/or computer system 50 may include components for power supply operations, telemetry operations, control operations for downhole sensing tools, analysis operations related to downhole sensing tools as described herein, and response operations.

In the production or monitoring well environment 20C, a casing string 70 formed by casing segments 76 and connectors 78 has been installed in a borehole 25 that penetrates formations 29 of the earth 28. As desired, the casing string 70 may be cemented in place in the borehole 25 using cement 73. Along the interior or exterior of the casing string 70, various downhole sensing tools 36A-36N are deployed permanently or temporarily. For permanent deployment, downhole sensing tools 36A-36N can be integrated with the casing string 70 or they can be installed in place using the cement 73. In at least some embodiments, the downhole sensing tools 36A-36N include a cable 72 with sensor packages 74. The cable 72 may run along the interior of the casing string 70 or may run along the exterior of the casing string 70 as shown. The cable 72 may include electrical conductors and/or optical fibers to convey power and/or communications. Additionally or alternatively, the cable 72 itself may operate as a distributed sensor (e.g., temperature, pressure, and sound is detectable using an optical fiber and distributed sensing technology). For temporary deployment, wireline, slick line, coiled tubing, or smaller diameter tubulars may be used to lower and raise downhole sensing tools 36A-36N along an interior of the casing string 70.

Figure 3A:
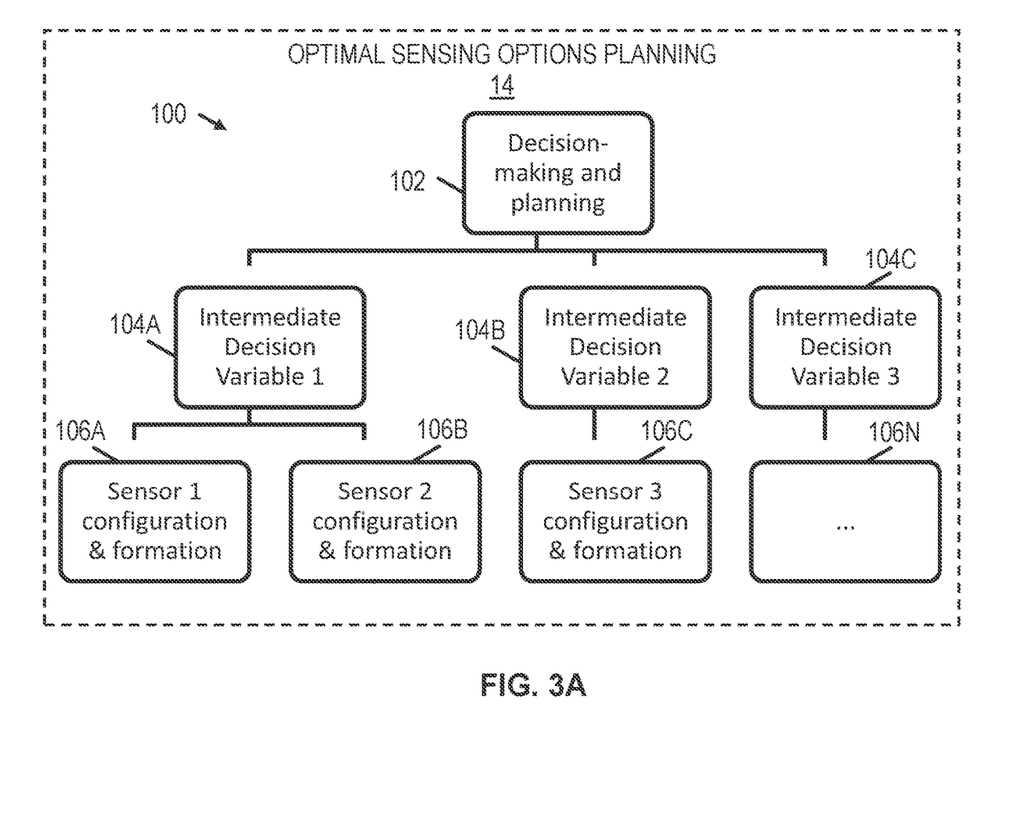
FIGS. 3A and 3B are block diagrams showing illustrative sensing tool planning block.
Figure 3B:
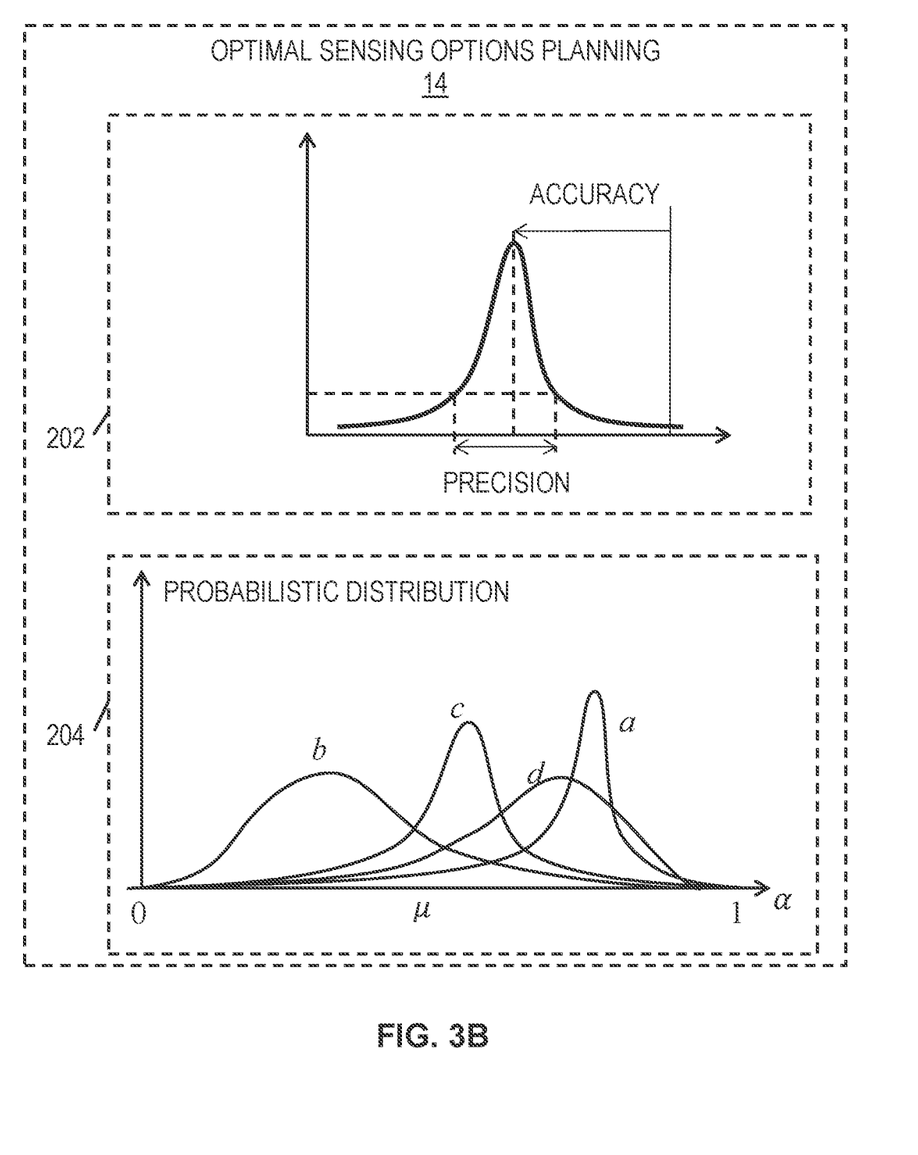

FIGS. 3A and 3B are block diagrams showing illustrative sensing tool planning blocks 14. In FIG. 3A, operations of the optimal sensing tool planning block 14 may include a downhole evaluation plan determination process 100, where decision making and planning 102 is based on intermediate decision variables 104A-104C and respective sensor configurations 106A-106N for different formations. In accordance with at least some embodiments, the downhole evaluation plan determination process 100 involves modeling the relationship between sensor configurations, formation conditions, and intermediate decision variables. The downhole evaluation plan determination process 100 may also involve a decision-making problem formulated in the space defined by all intermediate decision variables, where the solution to this problem corresponds to the desired sensor configuration.

The relationship between the intermediate decision variables can be described various ways. In one approach, it is described by a multivariable function g as follows:

$$\begin{bmatrix} \Sigma_1 \\ \Sigma_2 \\ \vdots \\ \Sigma_n \end{bmatrix} = g\left(\begin{bmatrix} \sigma_1 \\ \sigma_2 \\ \vdots \\ \sigma_m \end{bmatrix}, \gamma\right),$$

where $\gamma$ denotes the geological condition of the region to be explored by the selected sensors, $[\Sigma_1 \Sigma_2 \ldots \Sigma_n]^T$ denotes a collection of intermediate decision variables, and $[\sigma_1 \sigma_2 \ldots \sigma_m]^T$ is a collection of variables describing the sensor configurations and characteristics. In one embodiment, the relationship between a sensor configuration and intermediate decision variables can be linearized, i.e., there exist a matrix A of appropriate dimension and a vector b of appropriate length such that $$\begin{bmatrix} \Sigma_1 \\ \Sigma_2 \\ \vdots \\ \Sigma_n \end{bmatrix} = A \begin{bmatrix} \sigma_1 \\ \sigma_2 \\ \vdots \\ \sigma_m \end{bmatrix} + b$$

Such a linear relationship, when sufficiently accurate to be used for the decision making of sensor configurations, can simplify the formulation of the decision-making problem, resulting in a faster solution.

In at least some embodiments, operations of an optimal sensing tool planning block 14 follows the following considerations. If $\sigma$ denotes a particular configuration (e.g., sensor types, numbers, distribution, operations, etc.), then the intermediate decision variables, which are job-dependent and are used to evaluate the sensor configuration, may include attribute values (e.g., accuracy, cost, failure rate, completion time, etc.). The cost associated with such a configuration is denoted as $COST(\sigma,\gamma)$. The corresponding accuracy is denoted by $ACCU(\sigma,\gamma)$, the corresponding reliability is described by failure rate $FAIL(\sigma,\gamma)$. In principle, $\gamma$ is not known. However, some information about the formation is often available, and $\gamma$ can thus be estimated a priori. Such information, although not accurate, can help with the sensor configuration. The total time for the formation characterization is a function of the operation of sensors, and therefore is a function of a. The completion time used is denoted by $TIME(\sigma)$.

Without loss of generality, if $\Sigma$ denotes all sensor configurations considered, and $\Gamma$ denotes all possible formations expected to be encountered during the formation characterization job, then the most cost effective sensor configuration can be determined by minimizing a certain objective function while ensuring that important constraints are satisfied. This is described in the following mathematical form:

$$\min_{\sigma \in \Sigma} G(\sigma, \Gamma),$$

$COST(\sigma,\Gamma) \leq COST_{max}$, $ACCU(\sigma,\Gamma) \leq ACCU_{max}$, $FAIL(\sigma,F) \leq FAIL_{max}$, $TIME(\sigma,\Gamma) \leq TIME_{max}$, where $$\min_{\sigma \in \Sigma} G(\sigma, \Gamma)$$

is a cost function which may take different forms. Note that the sensor and formation interaction are modeled by functions $COST(\sigma,\gamma)$, $ACCU(\sigma,\gamma)$, $FAIL(\sigma,\gamma)$, $TIME(\sigma,\gamma)$.

In one particular embodiment, the most cost effective sensor configuration is a weighted summation of different factors to be considered in the formation characterization job:

$$G(\sigma, \Gamma) = \max_{\gamma \in \Gamma}(W_1 * COST(\sigma, \gamma) +$$

-continued $$W_2*ACCU(\sigma, \gamma) + W_3*FAIL(\sigma, \gamma) + W_4*TIME(\sigma)),$$

where $W_i > 0$, $i=1, 2, 3, 4$ are weighting factors indicating the relative importance of different quantities considered in a sensor configuration task. In this particular embodiment, $G(\sigma, \Gamma)$ is essentially the quantity associated with the worst case formation estimation, and needs to be minimized by choosing the correct sensor configuration. The sensor configuration determined this way is least sensitive to any formation estimation error prior to the formation characterization job. The functions $G(\sigma,\Gamma)$, $COST(\sigma,\Gamma)$, $FAIL(\sigma,\Gamma)$ and $TIME(\sigma,\Gamma)$ address jointly the effects of all sensors selected for the planning, and make take various mathematical forms. For example, in one particular embodiment, $ACCU(\sigma,\gamma)$ in the above equation is defined by a weighted sum of accuracy penalty functions of individual sensors as below:

$$ACCU(\sigma,\gamma) = \omega_1 ACCU_1(\gamma) + \omega_2 ACCU_2(\gamma) + \ldots + \omega_N ACCU_N(\gamma),$$

where $\omega_1, \omega_2, \ldots, \omega_N > 0$, $ACCU_1(\gamma), ACCU_N(\gamma)$ are the accuracy penalty functions for the N sensors used in the formation probing task. In another embodiment, $ACCU(\sigma, \gamma) = \Psi(ACCU_1(\gamma), \ldots, ACCU_N(\gamma))$ where $\Psi$ is a multivariable nonlinear function which combines the accuracy of different sensors to produce a unique overall accuracy quantity.

In another embodiment, $G(\sigma,\Gamma) = W_1*COST(\sigma,\gamma_0) + W_2*ACCU(\sigma,\gamma_0) + W_3*FAIL(\sigma,\gamma_0) + W_4*TIME(\sigma)$, where $\gamma_0 \in \Gamma$ is the most probable formation to be encountered for the formation characterization task. The constraints COST $(\sigma,\Gamma)$, $ACCU(\sigma,\Gamma)$, $FAIL(\sigma,\Gamma)$ and $TIME(\sigma,\Gamma)$ are optional, and can also be casted in different forms as is the case for the objective function. For example, the constraints can focus on either the worst case scenario, or the most likely scenario.

In another embodiment of the invention, instead of producing only one sensor configuration solution that minimizes an objective function, a number of top solutions using different objective functions (e.g., by adjusting the weighing factors in the objective function) are produced, and presented to the final user of the sensors to make the final decision.

One approach for downhole evaluation plan optimization involves solving the problem introduced above using the Monte Carlo simulation method, which samples all possible sensor configurations and formation estimates, checks whether the constraints are satisfied and selects the best configuration(s). Other methods, such as the mixed integer linear/nonlinear programming can also be used to find the best sensor configuration.

It is often desirable to define the accuracy and precision of the sensors in a probability sense when associated with a particular formation probing task. An introduction to how probability considerations can be incorporated in certain embodiments follows and corresponding information is provided in graphs 202 and 204 of FIG. 3B, which correspond to another illustrative sensing tool planning block 14.

If y is the reference quantity to be measured by the sensor, and if $M(y)$ is the measurement given by the sensor corresponding to y, then $M(y)$ has a certain probabilistic distribution, as shown in chart 202 of FIG. 3B. Typically, the expected value of $M(y)$ is different from y, and the difference is related to the accuracy of the sensor. If $E(x)$ is the expected value of a probabilistic value x, then the accuracy of the sensor is high if $|E(M(Y))-y|$ is small. Note that $|E(M(y))-y|$ could be different for different y values. Meanwhile, if $f_M(M(y),y)$ is the probability density function of $M(y)$ and $\psi(y)$ is the probability density function of the variable y during the formation characterization task, then the expected accuracy of the sensor in the full reference quantity range $[y_{min}, y_{max}]$ can be defined by the following formula:

$$P_{EAi} = \int_{y_{min}}^{y_{max}} f_M(M(y), y) * |E(M(y)) - y|\psi(y)dy$$

Also, the probability that the measurement of the sensor i is out of the bound $|M(y)-y| \leq \eta$ is given by the following formula:

$$P_i(\eta) = \int_{y_{min}}^{y_{max}} \left[ \int_{y_{min}}^{y-\eta} f_M(x, y)dx + \int_{y+\eta}^{y_{max}} f_M(x, y)dx \right] \psi(y)dy$$

During the sensor selection process, the following constraints can be added to address sensor accuracy with probability considerations:

$$P_{EAi} \leq p_{ia}$$

$$P_i(\eta) \leq p_{ib}$$

Note that sensor configuration a determines the index i in the above constraints. It is also possible to include $\eta$ into the cost function.

In some embodiments, intermediate decision variables are incorporated into the decision making process as follows. For example, in a potential perforation job in a well completion operation, there exists a potential production zone in the well and a decision needs to be made whether to perforate in this zone. The sensor information, which could either be historical data from logging tool, seismic data, or the data from the logging tools on the same tool string containing the perforation gun, can be used to calculate the hydrocarbon volumetric ratio $\alpha$ in this potential production zone, where a is a real value between 0 and 1. The distribution of a is different for different rock formation properties. Also, the distribution of a is affected by sensor configuration. In the above perforation scenario, the criteria used for the perforation decision are:

1) when the probability that the hydrocarbon volumetric ratio $\alpha$ is larger than the threshold value $\mu$ is larger than the threshold $\beta+\Delta_r$, i.e., $P(\alpha > \mu) > c$, then perforation should be completed in this zone;
2) If $P(\alpha > \mu) < \beta - \Delta_l$, then this zone should not be perforated;
3) If $\beta - \Delta_l \leq P(\alpha > \mu) \leq \beta + \Delta_r$, then the decision can be made based on certain variable that considers both the probability $P(\alpha > \mu)$ and the variance of the $\alpha$. For example, $\tilde{p}(\alpha) = P(\alpha > \mu + k \cdot var(\alpha))$, and the decision criteria is, if $\tilde{p}(\alpha) \geq \beta + \Delta_m$, then proceed to perforation, otherwise no perforation in the zone of interest.

In at least some embodiments, $$P(\alpha > \mu) = \int_\mu^1 f(\alpha)d\alpha$$

$$P(\alpha < \mu) = \int_0^\mu f(\alpha)d\alpha.$$

If the perforation decision can be made by criteria 1) and 2) even using low accuracy sensors based on historical data or simulation, then low accuracy sensors should be selected for the sensor configuration task, since more accurate sensors do not provide any extra benefit for perforation decision making and will increase the cost. However, if the perforation decision cannot be made after checking criteria 1) and 2), then the application of more accurate sensors should be considered in the decision process. Using the criterion 3), numerical cost functions can be established for comparing different sensor configurations. For example, the following objective function can be included in the cost function of the optimization problem formulated previously:

$$Cost_p = \sum_{i=1}^{N} C_i(\tilde{p}_i(\alpha)) * (\text{Cost}(sensor_i) + \delta(\tilde{p}(\alpha) - \beta - \Delta_m)\text{Cost}(\text{Perforation})) + \delta(\beta + \Delta_m - \tilde{p}(\alpha)) * LossRisk_i(\tilde{p}(\alpha))),$$

where N is the total number of sensor configurations considered in the planning job, $C_i=0$ or $C_i=1$, $$\sum_{i=1}^{N} C_i = 1,$$

which means that only one sensor configuration will be selected. Cost(sensor$_i$) is the cost associated with the installation and deployment of the ith sensor configuration. Cost (Perforation) is the cost of perforation. $\delta$ is a step function with $\delta(x)=1$ if $x \geq 0$ and $\delta(x)=0$ if $x<0$. Note that if $\tilde{p}(\alpha)<\beta+\Delta_m$, then this term does not contribute to the cost $Cost_p$ since $\delta(\tilde{p}(\alpha)-\beta-\Delta_m)=0$. LossRisk$_i(\tilde{p}(\alpha))$ is a penalty function which quantizes the potential loss of hydrocarbon production when the decision is not to perform the perforation while the zone is actually productive.

High accuracy sensors can narrow the distribution of a to facilitate the decision making at a higher economic cost. As an example, graph 204 in FIG. 3B illustrates how sensor selection can be incorporated into the hydrocarbon exploration and production decision process. In graph 204, four hydrocarbon volumetric ratio probability density curves are represented. Curves a and d are simulated probability density functions using two different types of sensors for the same formation. Suppose $\beta+\Delta_r=0.5$, then according to criterion 1), the same decision that perforation should be performed for this formation can be concluded using either type of sensors, therefore it is better to choose the lower cost lower accuracy sensor corresponding to curve d for the actual formation characterization task. If the probability density curve of the formation corresponds to b, and $\beta+\Delta_i=0.5$, then according to criterion 2), the formation should not be perforated. If the probability density function correspond to curve c, then criterion 3) may need to be used to decide whether to perforate the zone and which sensor configuration should be used.

In the following technique, intermediate decision variables are determined using multiple sensor measurements. This is a general problem that is encountered in hydrocarbon exploration and production. In the perforation scenario, for example, the intermediate decision variable could correspond to the location of a hydrocarbon formation as determined using measurements from different types of downhole sensing tools.

More specifically, estimators in the form of dynamic systems may be used to evaluate certain properties of the downhole condition based on sensor measurement. For example, consider a downhole condition property, which can be quantized by a real number, or an array of real numbers Y, then the prediction of this property from the $i^{th}$ sensor, referred to as $Y_i$, can be obtained from the following estimator with linear dynamics equations:

$$X_i(k+1)=A_iX(k)+B_iu_i(k)+G_iw_i(k)$$

$$Y_i(k)=C_iX(k)+D_iu_i(k)$$

The above dynamics equations are written in the discrete time domain, where k is the index for the $k^{th}$ sampling time, $X_i$ is an array of a certain number of real numbers, referred to as states for the $i^{th}$ sensor. $X_i$ is an array of numbers containing $n_i$ elements. $n_i$ can be different for different sensors. $Y_i$ is a real number representing the prediction of the quantity of interest given by $i^{th}$ sensor. $A_i$, $B_i$, $C_i$, and $D_i$ are matrices of appropriate dimensions. The matrices $A_i$, $B_i$, $C_i$, $G_i$, and $D_i$ in the above equations can be designed to implement different techniques, such as Kalman filter, Markov chain, or they can be generated by fitting the measurement data. Note that the matrices $A_i$, $B_i$, $C_i$, and $D_i$ may also depend on the relative position between the individual sensors and the location of interest for well condition assessment.

Note that the extension of above linear dynamics to the nonlinear case can be achieved using techniques such as the Extended Kalman Filter (EKF), and the basic procedures of the proposed method introduced below still follows.

When multiple sensors are used to estimate the same quantity Y, predictions from individual sensors may be different from each other, and they may have different convergence speed. Therefore, the decision regarding which sensor measurements to rely upon is not a trivial decision. Also, the decision regarding how to combine available measurements is not a trivial decision.

In order to address these challenges, at least some embodiments identify a downhole condition as follows:
1. Determine a quantity of the downhole condition that needs to be estimated.
2. Choose the set of sensors which should be used in the estimation. Let $\beta=\{1, 2, \ldots, N\}$ denotes the set of selected sensors.
3. Determine the estimation using estimators for selected sensors, correlation matrices and predetermined functions $$X_i(k+1)=A_iX(k)+B_iu_i(k)+G_iw_i(k)\Sigma_{j\in\beta,j\neq i}C_{i,j}(Y_j-Y_i)$$

$$Y_i(k)=C_iX(k)+D_iu_i(k)$$

$$Y(k)=f(Y_1(1),Y_2(1),\ldots,Y_N(1),Y_1(2),Y_2(2),\ldots,Y_N(2),\ldots,Y_1(k),Y_2(k),\ldots,Y_N(k)) \quad (1)$$

4. By comparing the individual estimations $Y_i$ with the consensus estimation Y and/or other sensor's estimates over a certain time period, which contains at least one sampling time, determine whether some sensors are not functioning properly. If this is the case, remove this sensor from the collection of selected sensors, and go back to step 3. Otherwise, proceed to the next step.

5. Go to the next sampling time by increasing by one, and generate the estimation for the next time step by going to step 3.

Figure 4:
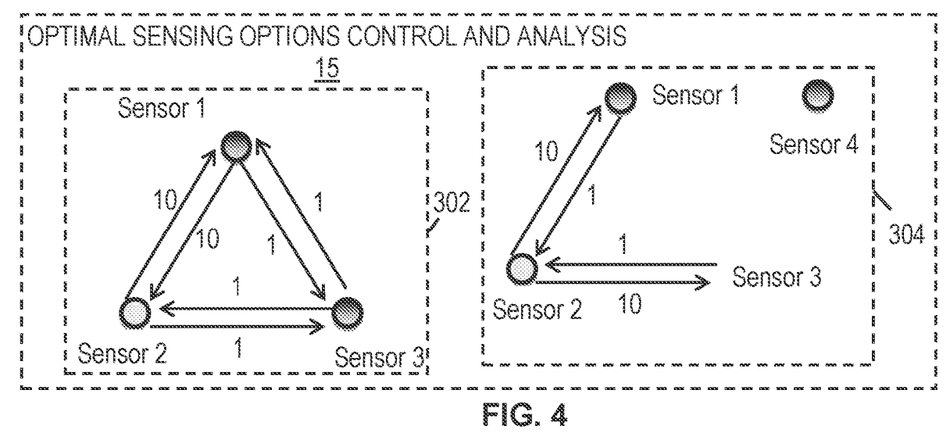
FIG. 4 is a block diagram showing illustrative sensing tool control and analysis block.

In at least some embodiments, a correlation matrix C is generated a priori based on the distribution as well as the characteristics of the sensors. C is a matrix with elements 0 or a positive real number. For the element at the $m^{th}$ row and $n^{th}$ column of the matrix C, which is denoted as $C_{m,n}$, its value is determined by the extent to which the estimation of the $m^{th}$ sensor is correlated to the estimation of the $n^{th}$ sensor. A large value of $C_{m,n}$ represents a large correlation. In this case, the estimation of the $m^{th}$ sensor is strongly influenced by the estimation of the $n^{th}$ sensor, while it is also driven by its own measurement $u_i$. Note that the correlation between two sensors are not required to be symmetric, i.e., in terms of mathematical formulation, $C_{m,n}$ is not required to be equal to $C_{n,m}$. This allows assigning different authorities to different sensors depending on their type and quality. When the $m^{th}$ sensor and the $n^{th}$ sensor has no correlations, then $C_{m,n}=0$.

Consider an example involving fiber optic sensors distributed on the same fiber optic cable, the measurements of the sensors are naturally correlated by their locations along the cable. In some cases, two sensors (sensors 1 and 2) are closer to each other than to another sensor (sensor 3). Therefore, the estimation provided by each of sensors 1 and 2 should be closer to each other than to the estimation provided by sensor 3. As an example, a correlation and weighting matrix can be used as follows:

$$C = \begin{bmatrix} 0 & 10 & 1 \\ 10 & 0 & 1 \\ 1 & 1 & 0 \end{bmatrix}, \quad (2)$$

which allows stronger correlation between sensors 1 and 2, and weaker correlation otherwise. Note that the numbers in the above matrix are for illustration purpose only.

When multiple sensors are used to estimate a particular quantity of interest, and some sensors operates on different physical principles, then the correlation between these sensors can be reduced to small number or zero to ensure that these sensors perform their estimation tasks independently. For example, when sonic, density, neutron, or magnetic resonance logging tools are used at the same time to probe the porosity of the formation, it is justifiable to reduce or eliminate the correlation between these tools.

When some sensors are known to be more accurate than others, the correlation and weighting matrix C can be set asymmetrically to capture such a difference of accuracy. The more accurate sensors should be relied upon more than the less accurate ones to identify a downhole condition. Two approaches may be used for correlation and weighting as follows. The first approach uses a function $f(Y_1(k), Y_2(k), \ldots, Y_N(k))$ such that the accurate sensors will have more influence on the value of the function. For example, when use $$Y(k) = f(Y_1(k), Y_2(k), \ldots, Y_N(k)) = \sum_{i=1}^{N} W_i Y_i(k),$$

where $W_i$ are weighting factors assigned to different sensor estimations. The stronger influence from more accurate sensors can be achieved by assigning higher weights $W_i$. The second approach is to use the estimations from more accurate sensors to directly influence the estimation process of the less accurate sensors. For example, if the $m^{th}$ sensor more accurate than the $n^{th}$ sensor, then the elements in the weighting matrix C can be chosen such that $C_{m,n}<C_{n,m}$, such that the estimation of the $m^{th}$ sensor, $Y_m$, is used to correct the estimation of the $n^{th}$ sensor, but the estimation of the $n^{th}$ sensor, $Y_n$, is less affected by the estimation of the $n^{th}$ sensor.

The topology information in the correlation and weighting matrix C can be visualized using a graph composed of a vertex and an edge set. Each vertex in the vertex set corresponds to a particular sensor. Each edge in the edge set correspond to a particular element in the correlation and weighting matrix C.

An illustration of matrix C is represented in graph 302 of FIG. 4, which shows an illustrative optimal sensing options control and analysis block 15. Another graph 304, corresponding to a collection of four sensors, is shown in FIG. 4. In graph 304, sensor 2 is a highly accurate sensor, therefore its estimation is used to correct estimations of other sensors by assigning high weighting factors to the corresponding edges (arrows in the plot). Meanwhile, sensor 4 operates differently from sensors 1, 2, and 3, and provides a completely independent estimation. The correlation and weighting matrix corresponding to graph 304 in FIG. 4 is shown below:

$$C = \begin{bmatrix} 0 & 10 & 10 & 0 \\ 1 & 0 & 0 & 0 \\ 1 & 0 & 0 & 0 \\ 0 & 0 & 0 & 0 \end{bmatrix}$$

Note that in this discussion, the diagonal terms of the correlation and weighting matrix are set as zeros. This is because the examples given correspond to scenarios where the sensors do not perform self-correction. If self-correction is necessary, then these terms can be set as other values.

As desired, information from different types of downhole sensing tools can be considered together to identify a downhole condition. By considering the measurements of different types of downhole sensing tools together with appropriate correlation and weighting values, the accuracy of identifying a downhole condition is improved.

Figure 5:
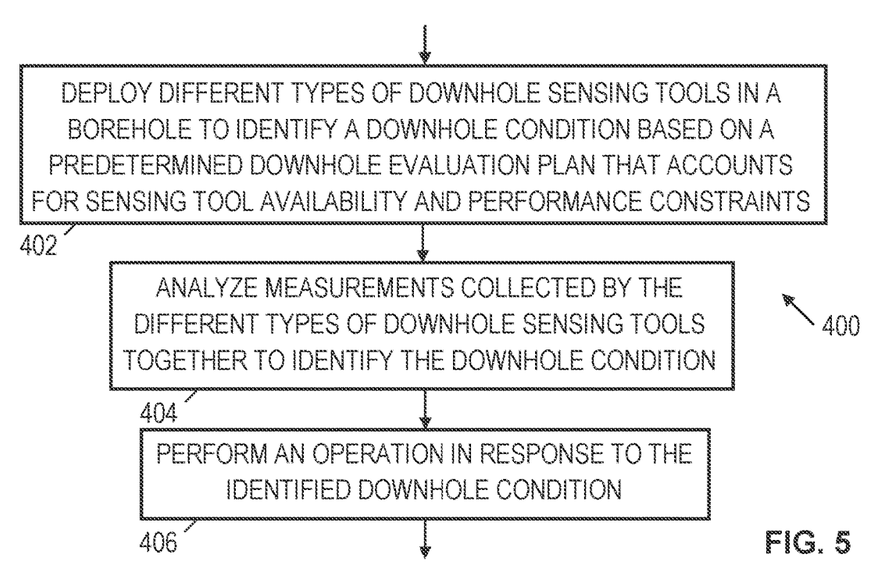
FIG. 5 is a flowchart showing an illustrative method for optimized downhole condition identification and response using different types of downhole sensing tools.

FIG. 5 is a flowchart showing an illustrative method 400 for optimized downhole condition identification and response using different types of downhole sensing tools. As shown, the method 400 comprises deploying different types of downhole sensing tools in a borehole to identify a downhole condition based on a predetermined downhole evaluation plan that accounts from sensing tool availability and performance constraints (block 402). The different types of downhole sensing tools can be deployed permanently (e.g., cemented in place) or temporarily (e.g., via wireline, slick line, coiled tubing, casing string, etc.) in the borehole. The timing of deployment operations can vary (downhole sensing tools can be deployed at the same time or at different times). At block 404, measurements collected by the different types of downhole sensing tools are analyzed together to identify the downhole condition. For example, the measurements from the different types of downhole sensing tools can be correlated and/or weighted to identify the downhole condition. At block 406, at least one device performs an operation in response to the identified downhole condition. Example operations performed in response to identifying the downhole condition include perforation operations (e.g., performed by a perforator) or other well completion operations, downhole condition display operations (e.g., performed by an output device such as a computer monitor or printer), and well intervention or well repair operations.

Embodiments disclosed herein include:

A: A system that comprises different types of downhole sensing tools deployed in a borehole, wherein the different types of downhole sensing tools are optimized to identify a downhole condition based on a predetermined downhole evaluation plan that accounts for sensing tool availability and performance constraints. The system also comprises at least one processing unit configured to analyze measurements collected by the different types of downhole sensing tools, wherein the collected measurements are analyzed together to identify the downhole condition. The system also comprises at least one device that performs an operation in response to the identified downhole condition.

B: A method that comprises deploying different types of downhole sensing tools in a borehole, wherein the different types of downhole sensing tools are optimized to identify a downhole condition based on a predetermined downhole evaluation plan that accounts for sensing tool availability and performance constraints. The method also comprises analyzing, by at least one processing unit, measurements collected by the different types of downhole sensing tools, wherein the measurements are analyzed together to identify the downhole condition. The method also comprises performing, by at one least device, an operation in response to the identified downhole condition.

Each of the embodiments, A and B, may have one or more of the following additional elements in any combination. Element 1: wherein the performance constraints including a cost constraint, an accuracy constraint, a reliability constraint, and a time constraint. Element 2: wherein the predetermined downhole evaluation plan is based on selection of one of a plurality of different downhole evaluation plans. Element 3: wherein the selection is performed by a user. Element 4: wherein the selection is performed based on minimizing an objective function. Element 5: wherein the predetermined downhole evaluation plan is based on a model that correlates different combinations of downhole sensing tools with intermediate decision variables. Element 6: wherein the at least one processing unit analyzes the measurements together to identify the downhole condition based on a predetermined correlation matrix. Element 7: wherein the at least one processing unit analyzes the measurements together to identify the downhole condition based on a predetermined weighting matrix. Element 8: wherein the at least one device comprises a perforator. Element 9: wherein the at least one device comprises an output device that displays a representation of the downhole condition. Element 10: wherein some of the different downhole sensing tools are permanently installed in the borehole. Element 11: wherein some of the different downhole sensing tools are temporarily deployed in the borehole.

Element 12: wherein the performance constraints include a cost constraint, an accuracy constraint, a reliability constraint, and a time constraint. Element 13: wherein the predetermined downhole evaluation plan is based on selection of one of a plurality of different downhole evaluation plans. Element 14: wherein the predetermined downhole evaluation plan is based on a model that correlates different combinations of downhole sensing tools with intermediate decision variables. Element 15: wherein said analyzing the measurements together to identify the downhole condition is performed based on a predetermined correlation and weighting matrix. Element 16: wherein the at least one device comprises a perforator deployed in the borehole. Element 17: wherein some of the different types of downhole sensing tools are permanently installed in the borehole. Element 18: wherein some of the different types of downhole sensing tools are temporarily deployed in the borehole.

Numerous other variations and modifications will become apparent to those skilled in the art once the above disclosure is fully appreciated. It is intended that the following claims be interpreted to embrace all such variations and modifications where applicable.

What is claimed is:

1. A system that comprises:
   different types of downhole sensing tools deployed in a borehole, wherein the different types of downhole sensing tools are selected, arranged, and controlled to optimize identification of a downhole condition based on a predetermined downhole evaluation plan that accounts for sensing tool availability and performance constraints, wherein the predetermined downhole evaluation plan involves:
   modeling a relationship between sensor configurations, formation conditions, and intermediate decision variables, the model correlating different combinations of the different types of downhole sensing tools with the intermediate decision variables, and
   solving a decision-making problem formulated in a space defined by all the intermediate decision variables that corresponds to a desired sensor configuration;
   at least one processing unit configured to analyze measurements collected by the different types of downhole sensing tools, wherein the collected measurements are analyzed together to identify the downhole condition; and
   at least one device that performs an operation in response to the identified downhole condition.

2. The system of claim 1, wherein the performance constraints include a cost constraint, an accuracy constraint, a reliability constraint, and a time constraint.

3. The system of claim 1, wherein the predetermined downhole evaluation plan is based on a selection of one of a plurality of different downhole evaluation plans.

4. The system of claim 3, wherein the selection is performed by a user.

5. The system of claim 3, wherein the selection is performed based on minimizing an objective function.

6. The system according to claim 1, wherein the at least one processing unit analyzes the measurements together to identify the downhole condition based on a predetermined correlation matrix.

7. The system according to claim 1, wherein the at least one processing unit analyzes the measurements together to identify the downhole condition based on a predetermined weighting matrix.

8. The system according to claim 1, wherein the at least one device comprises a perforator.

9. The system according to claim 1, wherein the at least one device comprises an output device that displays a representation of the downhole condition.

10. The system according to claim 1, wherein some of the different types of downhole sensing tools are permanently installed in the borehole.

11. The system according to claim 1, wherein some of the different types of downhole sensing tools are temporarily deployed in the borehole.

12. A method that comprises:
    selecting, arranging, and controlling different types of downhole sensing tools deployed to optimize identification of a downhole condition based on a predetermined downhole evaluation plan that accounts for sensing tool availability and performance constraints, wherein the predetermined downhole evaluation plan involves:
- modeling a relationship between sensor configurations, formation conditions, and intermediate decision variables, the model correlating different combinations of the different types of downhole sensing tools with the intermediate decision variables, and
- solving a decision-making problem formulated in a space defined by all the intermediate decision variables that corresponds to a desired sensor configuration;

analyzing, by at least one processing unit, measurements collected by the different types of downhole sensing tools, wherein the measurements are analyzed together to identify the downhole condition; and performing, by at one least device, an operation in response to the identified downhole condition.

13. The method of claim 12, wherein the performance constraints include a cost constraint, an accuracy constraint, a reliability constraint, and a time constraint.

14. The method of claim 12, wherein the predetermined downhole evaluation plan is based on a selection of one of a plurality of different downhole evaluation plans.

15. The method according to claim 12, wherein analyzing the measurements together to identify the downhole condition is performed based on a predetermined correlation matrix and a weighting matrix.

16. The method according to claim 12, wherein the at least one device comprises a perforator deployed in a borehole.

17. The method according to claim 12, wherein some of the different types of downhole sensing tools are permanently installed in a borehole.

18. The method according to claim 12, wherein some of the different types of downhole sensing tools are temporarily deployed in a borehole.

\* \* \* \* \*